(12) United States Patent
Hashizume et al.

(10) Patent No.: US 11,181,135 B2
(45) Date of Patent: Nov. 23, 2021

(54) COMPOSITE MATERIAL ASSEMBLY

(71) Applicant: MITSUBISHI HEAVY INDUSTRIES, LTD., Tokyo (JP)

(72) Inventors: Ryosuke Hashizume, Tokyo (JP); Masayoshi Suhara, Tokyo (JP); Kunihiro Morishita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/956,736

(22) PCT Filed: Mar. 11, 2019

(86) PCT No.: PCT/JP2019/009696
§ 371 (c)(1),
(2) Date: Jun. 22, 2020

(87) PCT Pub. No.: WO2019/181607
PCT Pub. Date: Sep. 26, 2019

(65) Prior Publication Data
US 2020/0400171 A1  Dec. 24, 2020

(30) Foreign Application Priority Data

Mar. 19, 2018 (JP) .............................. JP2018-051610

(51) Int. Cl.
*F16B 5/02* (2006.01)
(52) U.S. Cl.
CPC ...................... *F16B 5/02* (2013.01)
(58) Field of Classification Search
CPC ................ B64C 1/00; Y10T 29/49826; Y10T 29/49947; Y10T 29/49948
See application file for complete search history.

(56) References Cited

U.S. PATENT DOCUMENTS 5,310,434 A * 5/1994 Vives ...................... F16B 19/04
156/92
2009/0297261 A1* 12/2009 Mons ...................... F16B 19/02
403/337

(Continued)

FOREIGN PATENT DOCUMENTS

JP  S48-070325 U  9/1973
JP  S62-098011 A  5/1987

(Continued)

OTHER PUBLICATIONS

JPS6298011A English translation and foreign reference submitted by applicant (Year: 1987).*

(Continued)

*Primary Examiner* — Jason L Vaughan
*Assistant Examiner* — Amanda Kreiling
(74) *Attorney, Agent, or Firm* — Manabu Kanesaka; Benjamin Hauptman; Kenneth Berner

(57) ABSTRACT

Provided is a composite material assembly (100) includes: a first composite material member (1) in which a first hole (51) is formed, a second composite material member (2) in which a second hole (52) is formed, and a fastener (3) that is to be inserted through the first hole (51) and second hole (52) to thereby connect the first composite material member (1) to the second composite material member (2). A first chamfered section (51C) is formed on at least one of both ends of the first hole (51), and a second chamfered section (52C) is formed on at least one of both ends of the second hole (52).

6 Claims, 7 Drawing Sheets

(56) References Cited

U.S. PATENT DOCUMENTS

| | | |
|---|---|---|
| 2013/0287490 A1 | 10/2013 | Nonaka et al. |
| 2016/0229552 A1 | 8/2016 | Gross et al. |
| 2017/0082131 A1 | 3/2017 | Bessho et al. |

FOREIGN PATENT DOCUMENTS

| | | |
|---|---|---|
| JP | 2000-320492 A | 11/2000 |
| JP | 2012-127387 A | 7/2012 |
| JP | 2015-182578 A | 10/2015 |
| JP | 2016-175634 A | 10/2016 |

OTHER PUBLICATIONS

JPS4870325U English translation and foreign reference submitted by applicant (Year: 1973).*

PCT/ISA/210, "International Search Report for International Application No. PCT/JP2019/009696," dated Apr. 9, 2019.

PCT/ISA/237, "Written Opinion of the International Searching Authority for International Application No. PCT/JP2019/009696," dated Apr. 9, 2019.

* cited by examiner

COMPOSITE MATERIAL ASSEMBLY

TECHNICAL FIELD

The present invention relates to a composite material assembly.

Priority is claimed on Japanese Patent Application No. 2018-051610 filed on Mar. 19, 2018, the content of which is incorporated herein by reference.

BACKGROUND ART

In recent years, there are an increasing number of examples where the fuselage and wings of an aircraft are formed of a composite material (composite material). A specific example of the composite material is a fiber reinforced plastic (abbreviate to FRP). Such composite materials have advantages compared to a case where the reinforcing material and the plastic are singly used. For example, the fiber reinforced plastic has improved strength compared to a case where plastic is used singly, and is superior to a metallic material in terms of corrosion resistance.

In a case where a large-sized structure is configured by using a composite material having a resin as the preform, such as a fiber reinforced plastic, a configuration in which a plurality of divided members are assembled is generally adopted. In this case, unlike a metallic material, joining by welding cannot be performed. Therefore, in many cases, members are joined to each other by a fastener (metal bolt) as described in PTL 1 below. More specifically, PTL 1 describes a structure in which end portions of base materials to be joined of laminated plates are overlapped in a thickness direction and thereafter a fastener is inserted through a through-hole formed in the overlapped portion to join the base materials to be joined.

CITATION LIST

Patent Literature

[PTL 1] Japanese Unexamined Patent Application Publication No. 2016-175634

SUMMARY OF INVENTION

Technical Problem

However, in the structure described in PTL 1, in a case where a tensile force acts along the surface direction of the base materials to be joined with respect to the fastener, not only does stress concentration occur at the edge of the hole, but stress concentrates due to uneven contact between the outer peripheral surface of the fastener (metal bolt) and the end edge of the through-hole, resulting in a decrease in strength.

The present invention has been made to solve the above-described problems, and an object thereof is to provide a composite material assembly capable of suppressing a decrease in strength.

Solution to Problem

A composite material assembly according to a first aspect is a composite material assembly including: a first composite material having a first hole formed therein; a second composite material having a second hole formed therein; and a fastener that connects the first composite material to the second composite material by being inserted into the first hole and the second hole, in which a first chamfered portion which is chamfered is formed on at least one of both ends of the first hole, and a second chamfered portion which is chamfered is formed on at least one of both ends of the second hole.

According to this aspect, in a case where a tensile force acts in a direction in which the first composite material and the second composite material are separated from each other in a surface direction thereof (a direction in which the two composite materials spread), stress concentration occurs between the fastener and at least one of both ends of the first hole and between the fastener and at least one of both ends of the second hole. In the above configuration, the first chamfered portion is formed on at least one of both ends of the first hole of the first composite material, and the second chamfered portion is formed on at least one of both ends of the second hole of the second composite material. Therefore, stress concentration can be relaxed by the first chamfered portion and the second chamfered portion. Thereby, it is possible to suppress a decrease in the strength of the first composite material and the second composite material due to a tensile force.

A composite material assembly according to a second aspect is the composite material assembly according to the first aspect in which the first chamfered portion is formed only on an end edge of the first hole on the second composite material side, out of the both ends of the first hole, and the second chamfered portion is formed only on an end edge of the second hole on the first composite material side, out of the both ends of the second hole.

A composite material assembly according to a third aspect is the composite material assembly according to the first aspect in which the first chamfered portion is formed on the both ends of the first hole, and the second chamfered portion is formed on the both ends of the second hole.

A composite material assembly according to a fourth aspect is the composite material assembly according to the first aspect in which the first chamfered portion is formed only on an end edge of the first hole opposite to the second composite material, out of the both ends of the first hole, and the second chamfered portion is formed only on an end edge of the second hole opposite to the first composite material, out of the both ends of the second hole.

A composite material assembly according to a fifth aspect is the composite material assembly according to any one of the first to fourth aspects further including: a first ring that fills a gap formed between the fastener and the first chamfered portion; and a second ring that fills a gap formed between the fastener and the second chamfered portion, in which the first ring and the second ring are formed of a material having a higher elastic modulus than the first composite material and the second composite material.

A composite material assembly according to a sixth aspect is the composite material assembly according to any one of the first, second, and fourth aspects further including: a first ring that fills a gap formed between the fastener and the first chamfered portion; and a second ring that fills a gap formed between the fastener and the second chamfered portion, in which the first ring and the second ring are formed of a material having a higher elastic modulus than the first composite material and the second composite material, the fastener includes a bolt inserted into the first hole and the second hole, a nut attached to a tip of the bolt, a first washer interposed between a head of the bolt and the first composite material, and a second washer interposed between the nut and the second composite material, the first ring is formed integrally with the first washer, and the second ring is formed integrally with the second washer.

A composite material assembly according to a seventh aspect is the composite material assembly according to any one of the first to sixth aspects, in which the first chamfered portion has a curved surface shape that gradually curves from an inner peripheral surface of the first hole toward a surface of the first composite material, and the second chamfered portion has a curved surface shape that gradually curves from an inner peripheral surface of the second hole toward a surface of the second composite material.

Advantageous Effects of Invention

According to the above aspects, a decrease in strength can be suppressed.

DESCRIPTION OF EMBODIMENTS

First Embodiment

Figure 1:
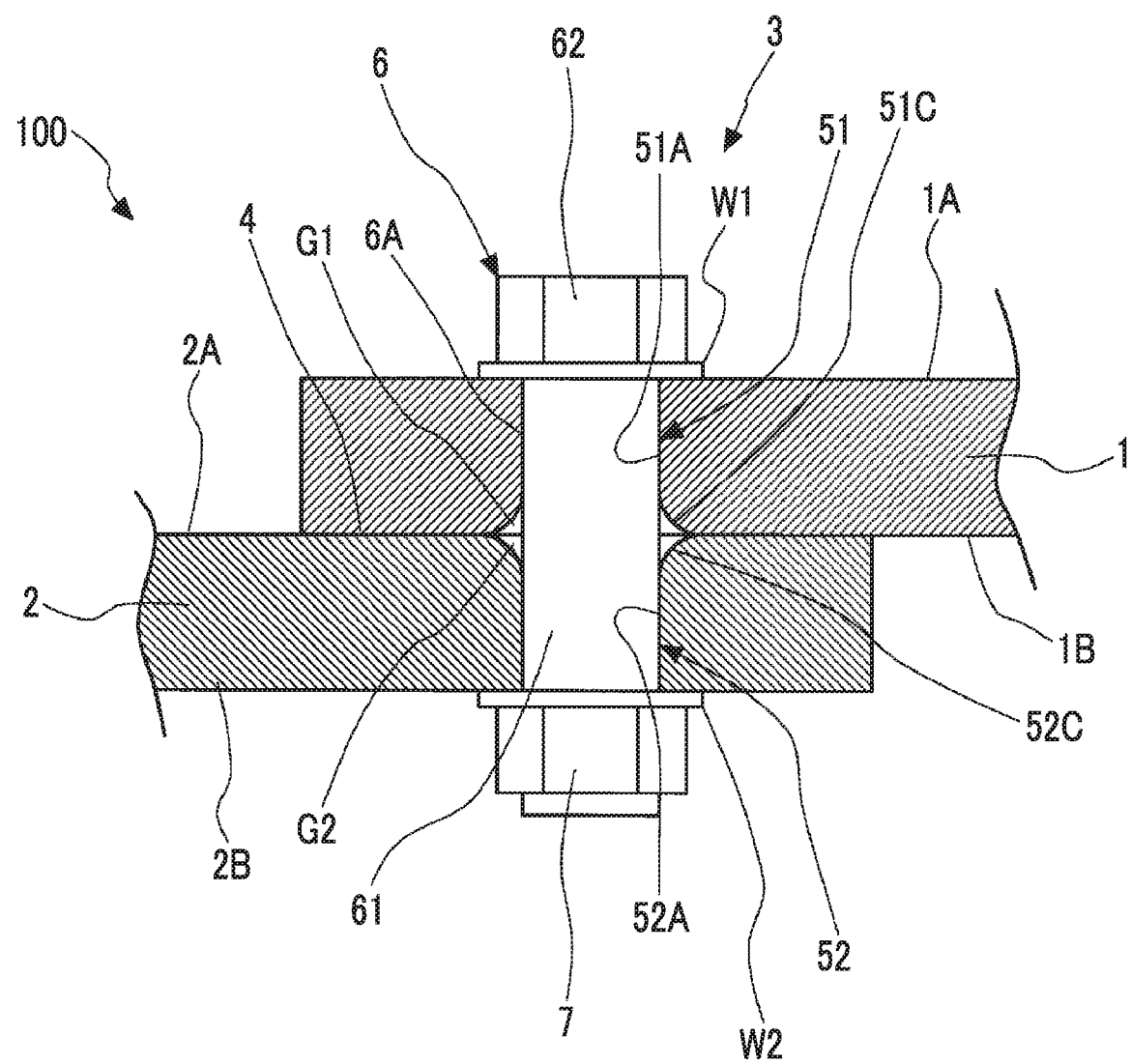
FIG. 1 is a cross-sectional view illustrating a configuration of a composite material assembly according to a first embodiment.

A first embodiment of the present invention will be described with reference to the drawings. A composite material assembly 100 according to the present embodiment is, for example, a plate member forming a fuselage or a wing of an aircraft. As illustrated in FIG. 1, the composite material assembly 100 includes a first composite material 1, a second composite material 2, and a fastener 3 for connecting these materials.

The first composite material 1 and the second composite material 2 have a plate shape formed of fiber reinforced plastic (FRP). In configuring a relatively large structure such as a fuselage or wing of an aircraft, a configuration in which a plurality of plate members are connected to each other is often adopted. In the present embodiment, an end portion of the first composite material 1 and an end portion of the second composite material 2 are overlapped with each other in a thickness direction thereof, and the fastener 3 is inserted into a through-hole formed in the end portions, whereby the first composite material 1 and the second composite material 2 are connected to each other. The surface where the first composite material 1 and the second composite material 2 are in contact with each other is an abutment surface 4. In the following description, the thickness direction of the first composite material 1 and the second composite material 2 may be simply referred to as "thickness direction".

In the vicinity of the end portion of the first composite material 1, a first hole 51 penetrating the first composite material 1 in the thickness direction is formed. The first hole 51 has a circular cross section. At least one end edge of the first hole 51 in the thickness direction is chamfered into a curved surface shape to form a first chamfered portion 51C. More specifically, the first chamfered portion 51C gradually curves from the inner peripheral surface (first inner peripheral surface 51A) of the first hole 51 toward the surface (first rear surface 1B) of the first composite material 1. That is, the first chamfered portion 51C has a continuous curved shape in a cross-sectional view, and has no corners (portions where straight portions intersect). In the present embodiment, the first chamfered portion 51C is formed only on the end edge of the first hole 51 on an abutment surface 4 side (that is, on the second composite material 2 side). That is, a corner is formed between the first inner peripheral surface 51A and a surface (first surface 1A) of the first composite material 1 opposite to the first rear surface 1B.

In the vicinity of the end portion of the second composite material 2, a second hole 52 penetrating the second composite material 2 in the thickness direction is formed. The second hole 52 has a circular cross section. At least the other end edge of the second hole 52 in the thickness direction is chamfered into a curved surface shape to form a second chamfered portion 52C. More specifically, the second chamfered portion 52C gradually curves from the inner peripheral surface (second inner peripheral surface 52A) of the second hole 52 toward the surface (second surface 2A) of the second composite material 2, that is, toward the abutment surface 4. That is, the second chamfered portion 52C has a continuous curved shape in the cross-sectional view, and has no corners (portions where straight portions intersect). In the present embodiment, the second chamfered portion 52C is formed only on the end edge of the second hole 52 on the abutment surface 4 side (that is, on the first composite material 1 side). That is, the second chamfered portion 52C faces the first chamfered portion 51C in the thickness direction. Accordingly, a gap G1 and a gap G2 are respectively formed between the outer peripheral surface of a bolt 6 (described later) (bolt outer peripheral surface 6A) and the first chamfered portion 51C and between the outer peripheral surface of the bolt 6 and the second chamfered portion 52C. A corner is formed between the second inner peripheral surface 52A and a surface (second rear surface 2B) of the second composite material 2 opposite to the second surface 2A.

The first composite material 1 and the second composite material 2 are overlapped in the thickness direction such that the first hole 51 and the second hole 52 are coaxial with each other. The fastener 3 connects the first composite material 1 to the second composite material 2 by being inserted into the first hole 51 and the second hole 52. More specifically, the fastener 3 includes the bolt 6 having a shank 61 inserted into the first hole 51 and the second hole 52 and a head 62 provided integrally with the shank 61, and a nut 7 attached to the end portion of the shank 61 opposite to the head 62.

The shank 61 of the bolt 6 has an outer diameter slightly smaller than the inner diameter of the first hole 51 and the second hole 52. The head 62 has a hexagonal shape, and can be rotated around the central axis of the shank 61 by being engaged with a tool such as a wrench. In addition, in the present embodiment, a case where the head 62 is located on the first composite material 1 side will be described as an example. However, the head 62 may also be located on the second composite material 2 side. An annular first washer W1 is interposed between the head 62 and the surface (first surface 1A) of the first composite material 1. The first washer W1 has a sufficiently larger area than the head 62 and thus distributes the stress generated between the head 62 and the first surface 1A over a wider range. The dimension of the first washer W1 in the thickness direction is sufficiently smaller than the dimension of the head 62 in the thickness direction.

A male screw is formed in a portion including the tip of the shank 61 (that is, the end portion opposite to the head 62). A female screw formed on the inner peripheral surface of the nut 7 is attached to the male screw in a state of being engaged. A second washer W2 is interposed between the nut 7 and the second rear surface 2B of the second composite material 2. Like the first washer W1, the second washer W2 is provided to distribute the stress generated between the nut 7 and the second rear surface 2B. With the above configuration, the first composite material 1 and the second composite material 2 are connected to each other.

Figure 2:
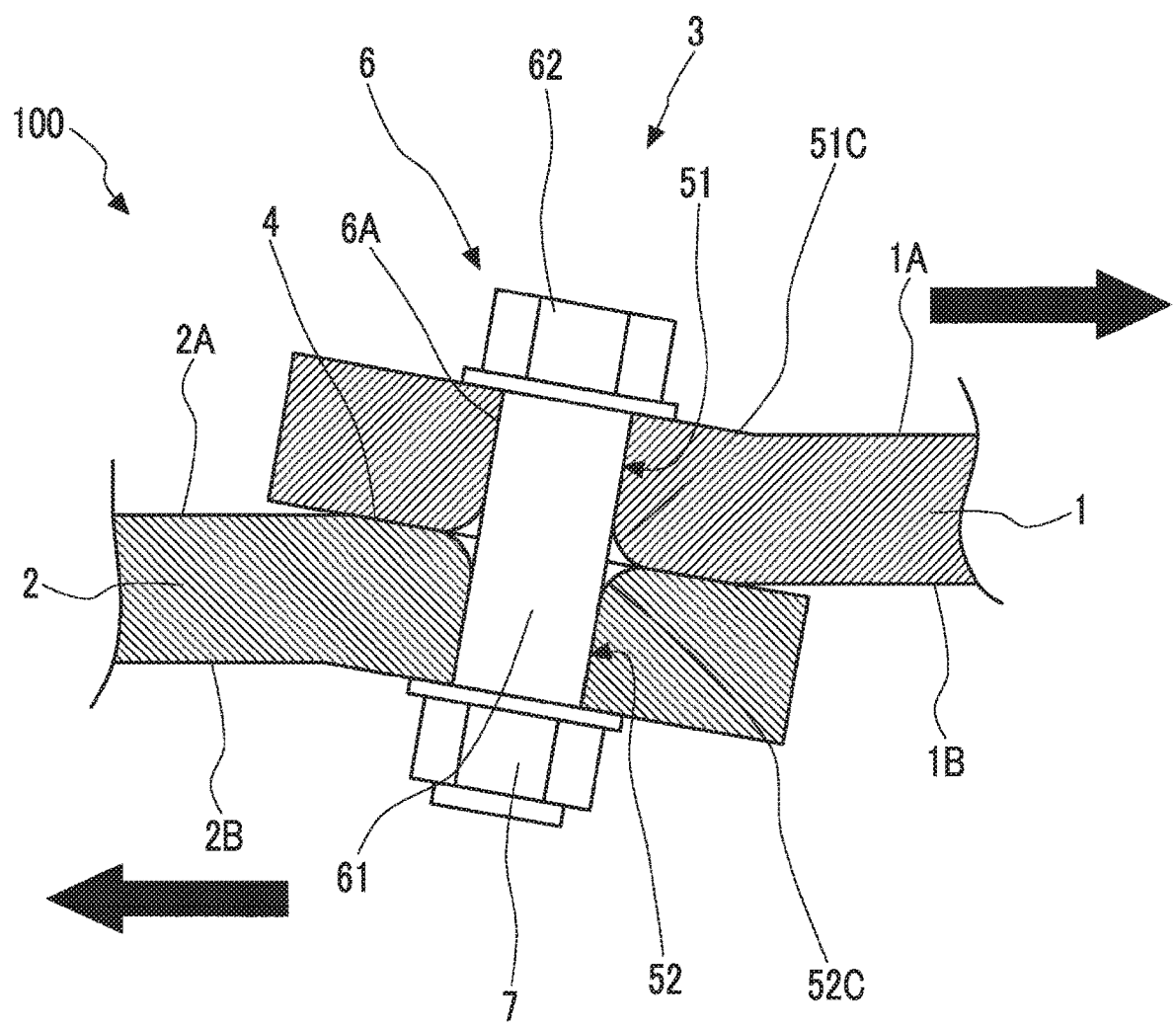
FIG. 2 is an explanatory view illustrating a state where a tensile force acts on the composite material assembly according to the first embodiment.

Here, in a case where the composite material assembly 100 is applied to, for example, the fuselage of an aircraft, a tensile force may act on the composite material assembly 100 due to an external force such as a pressure applied to the cabin during the flight. Similarly, in a case where the composite material assembly 100 is applied to the wing of an aircraft, a tensile force due to the bending or deformation of the wing may act. Specifically, as illustrated in FIG. 2, a force may be applied in a direction in which the first composite material 1 and the second composite material 2 are separated from each other in the surface direction (direction orthogonal to the thickness direction) with respect to the fastener 3.

In a case where the above-described tensile force acts, the end portion of the first composite material 1 (that is, the portion including the first hole 51) is curved toward the side separated from the second composite material 2 in the thickness direction. The end portion of the second composite material 2 (that is, the portion including the second hole 52) is curved toward the side separated from the first composite material 1 in the thickness direction. The fastener 3 (bolt 6) is slightly inclined with respect to the thickness direction. At this time, stress is generated between the bolt outer peripheral surface 6A and the inner peripheral surface (first inner peripheral surface 51A) of the first hole 51, and between the bolt outer peripheral surface 6A and the inner peripheral surface (second inner peripheral surface 52A) of the second hole 52. In particular, larger stress is concentrated on the end edge on one side (the first rear surface 1B side) of the first hole 51 and the end edge on the other side (the second surface 2A side) of the second hole 52 are larger than the other end edges. In a case where such stress concentration occurs, there is a possibility that local deformation such as a recess or delamination may occur at these end edges.

However, in the present embodiment, the first chamfered portion 51C is formed on one end edge of the first hole 51, and the second chamfered portion 52C is formed on the other end edge of the second hole 52. Therefore, stress concentration can be relaxed by the first chamfered portion 51C and the second chamfered portion 52C. Accordingly, the possibility that local deformation due to the tensile force may occur in the first composite material 1 and the second composite material 2 can be reduced. As a result, a decrease in the strength of the composite material assembly 100 can be suppressed.

In particular, a larger stress concentration occurs at the end edge of the first hole 51 on the second composite material 2 side and at the end edge of the second hole 52 on the first composite material 1 side compared to the respective opposite end edges. In the configuration according to the present embodiment, the first chamfered portion 51C and the second chamfered portion 52C are formed only at locations where particularly large stress concentrations occur. As a result, a decrease in the strength of the first composite material 1 and the second composite material 2 can be more effectively suppressed while minimizing the processing cost.

As described above, in the present embodiment, the first chamfered portion 51C and the second chamfered portion 52C are curved in the cross-sectional view.

At this time, curved R shapes of the first chamfered portion 51C and the second chamfered portion 52C in the cross-sectional view may be set in consideration of the movable angle of the shank 61 of the bolt 6 determined by the outer diameter of the shank 61 of the bolt 6 and the inner diameter of the first hole 51 and the second hole 52, and the elastic deformation of the bolt 6 caused by the shear force acting on the bolt 6.

At this time, if the R shapes of the first chamfered portion 51C and the second chamfered portion 52C are set so as to follow the elastic deformation of the bolt, the contact surface pressure between the first chamfered portion 51C, the second chamfered portion 52C, and the bolt 6 can be more uniformly distributed. For this reason, it is possible to avoid stress concentration due to uneven contact between the first chamfered portion 51C, the second chamfered portion 52C, and the bolt 6.

The first embodiment of the present invention has been described above. In addition, various changes and modifications of the above-described configuration can be made without departing from the gist of the present invention.

Figure 3:
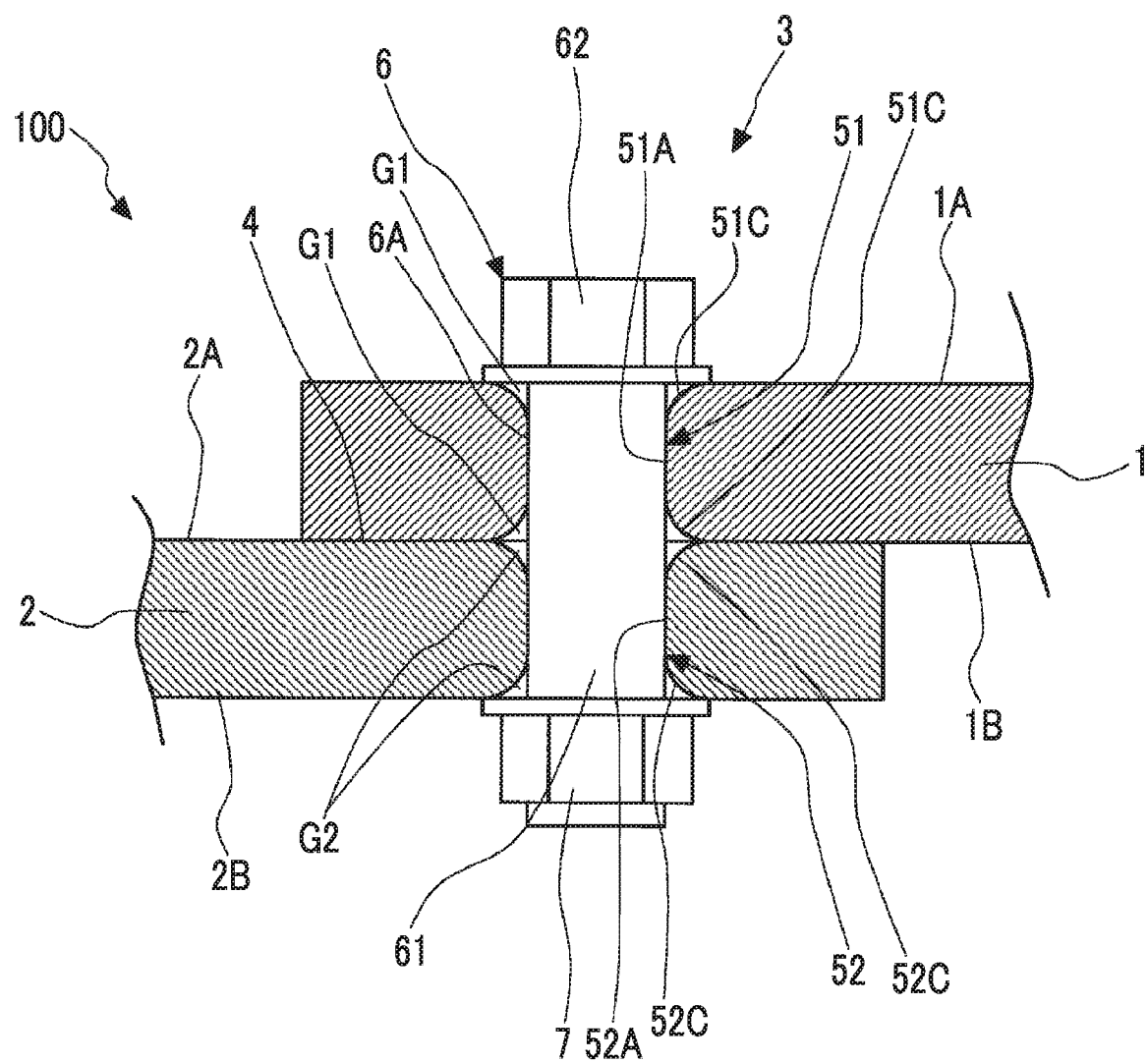
FIG. 3 is a cross-sectional view illustrating a modification example of the composite material assembly according to the first embodiment.

For example, in the above-described embodiment, the example in which the first chamfered portion 51C is formed on one end edge of the first hole 51 and the second chamfered portion 52C is formed only on the other end edge of the second hole 52 has been described. However, the positions where the first chamfered portion 51C and the second chamfered portion 52C are formed are not limited to the above example. As another example, as illustrated in FIG. 3, a configuration in which the first chamfered portions 51C are respectively formed on both ends of the first hole 51 and second chamfered portions 52C are respectively formed on both ends of the second hole 52 can be adopted. Specifically, in the above configuration, the corner formed by the first surface 1A and the first inner peripheral surface 51A is chamfered to form the first chamfered portion 51C. Furthermore, the corner formed by the second rear surface 2B and the second inner peripheral surface 52A is chamfered to form the second chamfered portion 52C.

With this configuration, the first composite material 1 and the second composite material 2 can sufficiently withstand stress in all directions including the above-described tensile force.

Figure 4:
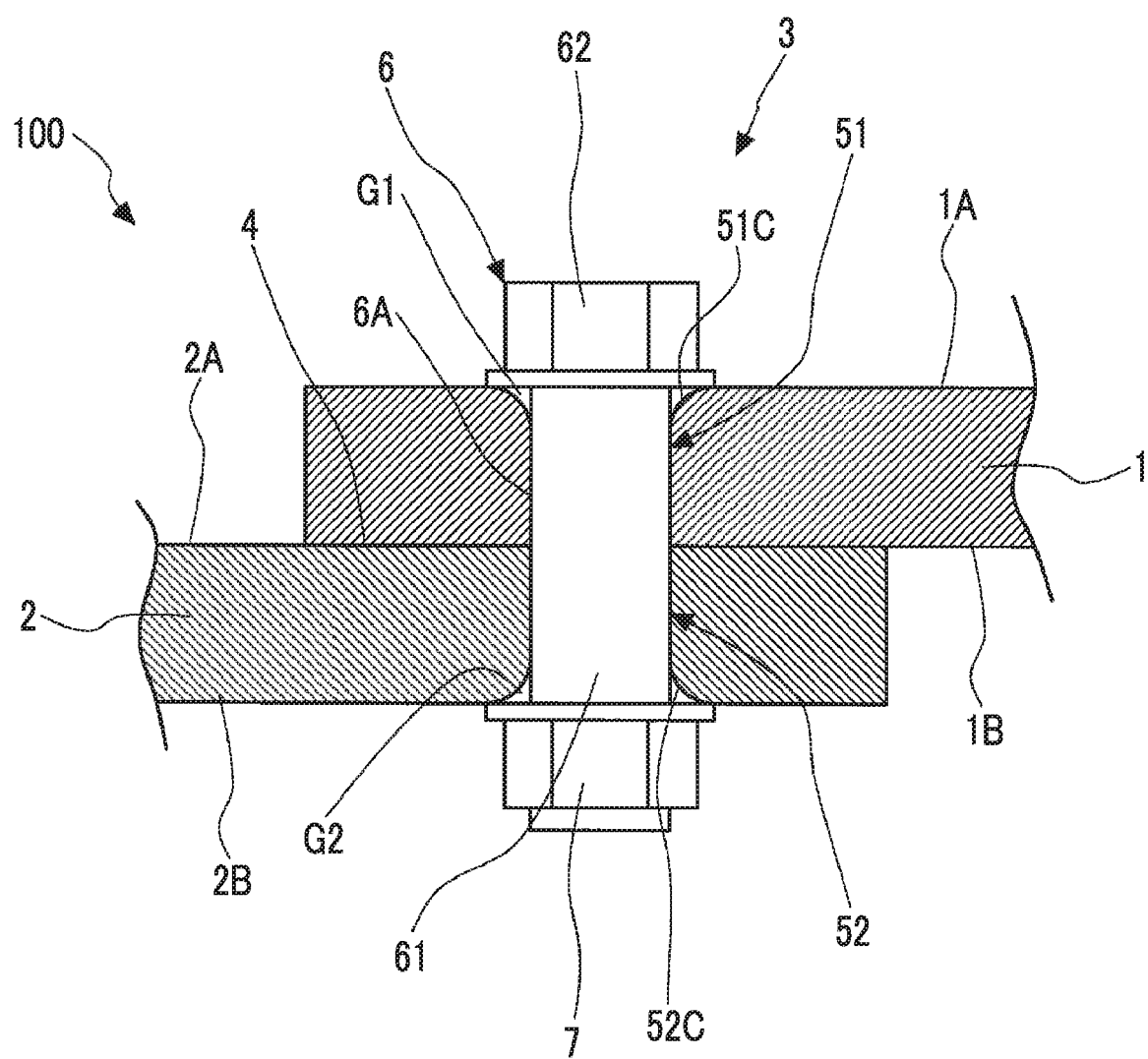
FIG. 4 is a cross-sectional view illustrating another modification example of the composite material assembly according to the first embodiment.

Furthermore, a configuration illustrated in FIG. 4 can also be adopted. In the example illustrated in the figure, the first chamfered portion 51C is formed only on the end edge of the first hole 51 opposite to the second composite material 2 (that is, only at the other end edge in the thickness direction) out of both ends of the first hole 51. Furthermore, the second chamfered portion 52C is formed only on the end edge of the second hole 52 opposite to the first composite material 1 (that is, only at one end edge in the thickness direction) out of both ends of the second hole 52.

With this configuration, the processing cost can be suppressed compared to the case where the first chamfered portions 51C are formed on both ends of the first hole 51 and the second chamfered portions 52C are formed on both ends of the second hole 52. Furthermore, with the above configuration, the first chamfered portion 51C and the second chamfered portion 52C are formed on the end edges of the first composite material 1 and the second composite material 2 opposite to the abutment surface 4. Therefore, the first chamfered portion 51C and the second chamfered portion 52C can be easily formed even after the first composite material 1 and the second composite material 2 are overlapped with each other. That is, in assembling the composite material assembly 100, workability can be improved.

Figure 5:
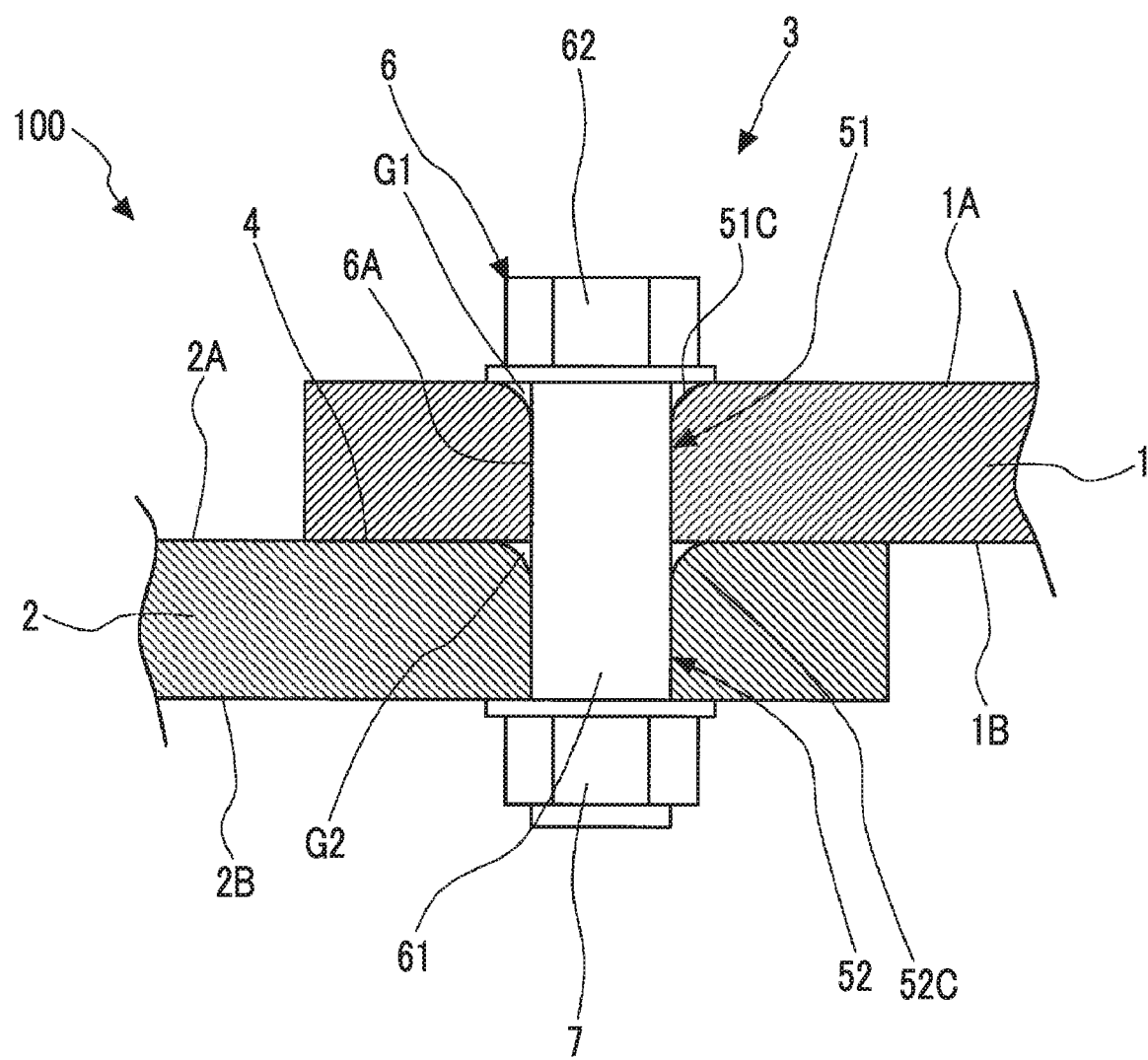
FIG. 5 is a cross-sectional view illustrating still another modification example of the composite material assembly according to the first embodiment.

Moreover, a configuration illustrated in FIG. 5 can be adopted. In the example illustrated in the figure, the first chamfered portion 51C is formed only on the end edge of the first hole 51 opposite to the second composite material 2 (that is, only at the other end edge in the thickness direction) out of both ends of the first hole 51. Furthermore, the second chamfered portion 52C is formed only on the end edge of the second hole 52 on the first composite material 1 side (that is, only at the other end edge in the thickness direction) out of the both ends of the second hole 52.

With this configuration, the processing cost can be suppressed compared to the case where the first chamfered portions 51C are formed on both ends of the first hole 51 and the second chamfered portions 52C are formed on both ends of the second hole 52. In addition, in the above configuration, the first chamfered portion 51C and the second chamfered portion 52C may be respectively formed only on one surfaces (that is, only on the other surfaces in the thickness direction) of the first composite material 1 and the second composite material 2. Therefore, the composite material assembly 100 can be configured without distinguishing the first composite material 1 and the second composite material 2 from each other. That is, the workability of assembly can be further improved.

Furthermore, in the above embodiment, the example in which the composite material assembly 100 is applied to the fuselage or wing of an aircraft has been described. However, the application target of the composite material assembly 100 is not limited to an aircraft, and the composite material assembly 100 can be applied to other transport machines including vehicles and the like, and further to other structures.

In addition, in the above embodiment, the example in which the bolt 6 (and the nut 7) is used as the fastener 3 has been described. However, the specific aspect of the fastener 3 is not limited to the above example, and other fasteners 3 including rivets can be used as the fastener 3.

Second Embodiment

Figure 6:
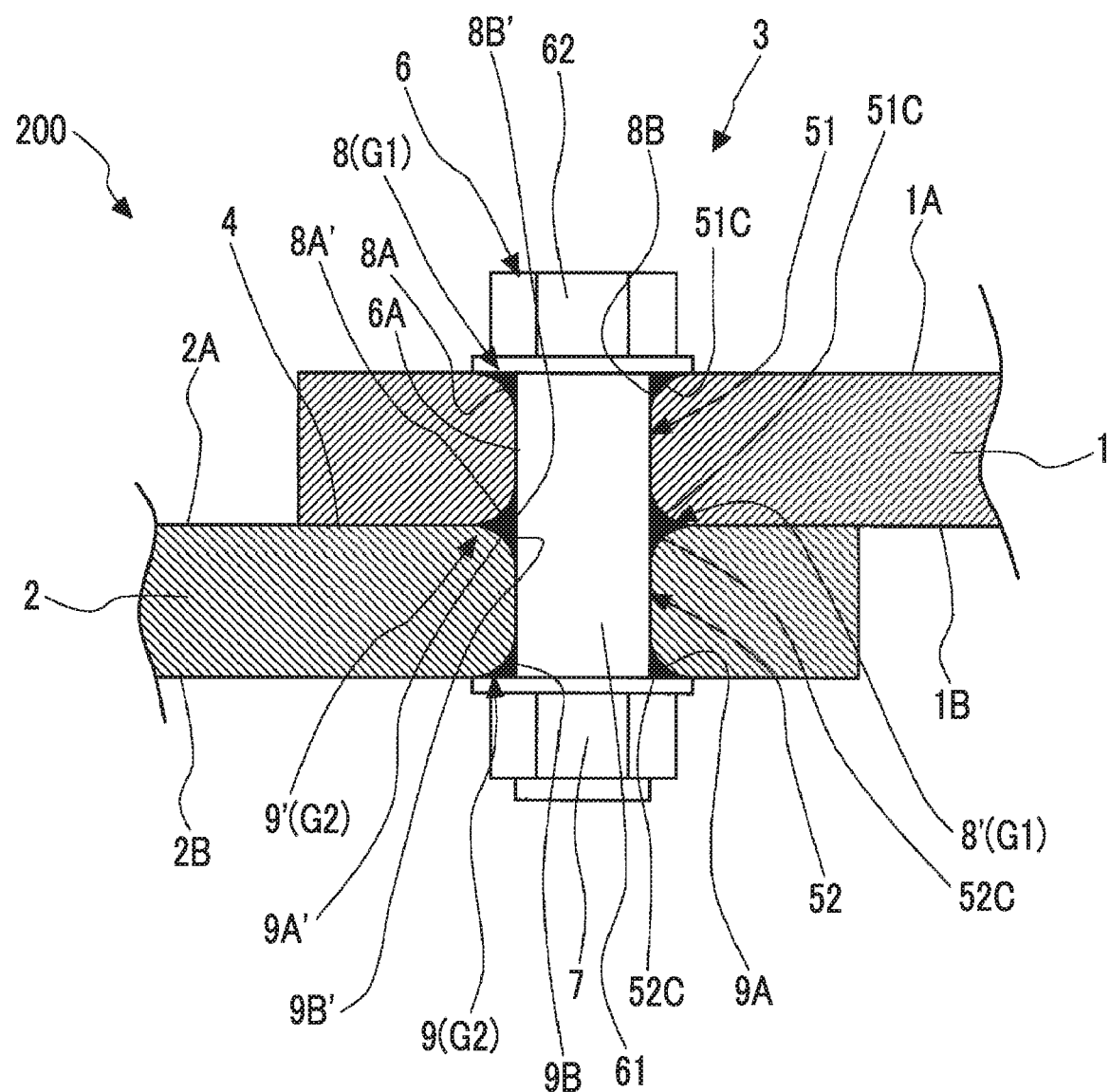
FIG. 6 is a cross-sectional view illustrating a configuration of a composite material assembly according to a second embodiment.

Subsequently, a second embodiment of the present invention will be described with reference to FIG. 6. Like configurations similar to those in the first embodiment are denoted by like reference numerals, and detailed description thereof will be omitted. As illustrated in the figure, in a composite material assembly 200 according to the present embodiment, the first chamfered portions 51C are respectively formed on both ends of the first hole 51, and the second chamfered portions 52C are respectively formed on both ends of the second hole 52. Furthermore, first rings 8 and 8' are respectively attached between the first chamfered portions 51C and the bolt outer peripheral surface 6A, and second rings 9 and 9' are respectively attached between the second chamfered portions 52C and the bolt outer peripheral surface 6A.

The first rings 8 and 8' have an annular shape, and fill gaps G1 and G1 formed between the first chamfered portions 51C and the bolt outer peripheral surface 6A. That is, the outer peripheral surfaces of the first rings 8 and 8' (first ring outer peripheral surfaces 8A and 8A') have the same curved shape as the first chamfered portion 51C. Similarly, the outer peripheral surfaces (second ring outer peripheral surfaces 9A and 9A') of the second rings 9 and 9' have the same curved shape as the second chamfered portion 52C. On the other hand, the inner peripheral surfaces of the first rings 8 and 8' (first ring inner peripheral surfaces 8B and 8B') and the inner peripheral surfaces of the second rings 9 and 9' (second ring inner peripheral surfaces 9B and 9B') extends along the bolt outer peripheral surface 6A. In other words, the first ring inner peripheral surfaces 8B and 8B' and the second ring inner peripheral surfaces 9B and 9B' form a cylindrical surface shape centered on the central axis of the bolt 6 (shank 61).

Each of the first rings 8 and 8' and the second rings 9 and 9' is formed of a material having a higher elastic modulus than the first composite material 1 and the second composite material 2. Specifically, the first rings 8 and 8' and the second rings 9 and 9' are formed of a metallic material such as aluminum, titanium, or iron.

With this configuration, since the first rings 8 and 8' fill the gap G1 between the fastener 3 and the first chamfered portions 51C, the stress generated between the fastener 3 and the first chamfered portions 51C are distributed by the first rings 8 and 8'. That is, stress concentration can be further reduced. Similarly, since the second ring 9 and 9' fills the gap G2 between the fastener 3 and the second chamfered portions 52C, the stress generated between the fastener 3 and the second chamfered portions 52C are distributed by the second rings 9 and 9'.

In addition, the first rings 8 and 8' and the second rings 9 and 9' are formed of a material having a higher elastic modulus than the first composite material 1 and the second composite material 2. Therefore, it is possible to sufficiently withstand the stress generated between the outer peripheral surface of the fastener 3 (the bolt outer peripheral surface 6A) and the first ring inner peripheral surface 8B and between the bolt outer peripheral surface 6A and the second ring inner peripheral surface 9B.

The second embodiment of the present invention has been described above. In addition, various changes and modifications of the above-described configuration can be made without departing from the gist of the present invention.

For example, among the first ring 8 and 8' and the second ring 9 and 9' in the above embodiment, the first ring 8' and the second ring 9' (that is, the first ring 8' of the pair of first rings 8 and 8' located on one side in the thickness direction and the second ring 9' of the pair of second rings 9 and 9' located on the other side in the thickness direction) adjacent to each other on the abutment surface 4 can be formed integrally with each other. With this configuration, the number of components can be reduced.

Furthermore, in the above embodiment, the example in which the composite material assembly 200 is applied to the fuselage or wing of an aircraft has been described. However, the application target of the composite material assembly 200 is not limited to an aircraft, and the composite material assembly 200 can be applied to other transport machines including vehicles and the like, and further to other structures.

In addition, in the above embodiment, the example in which the bolt 6 (and the nut 7) is used as the fastener 3 has been described. However, the specific aspect of the fastener 3 is not limited to the above example, and other fasteners including rivets can be used as the fastener 3.

Third Embodiment

Figure 7:
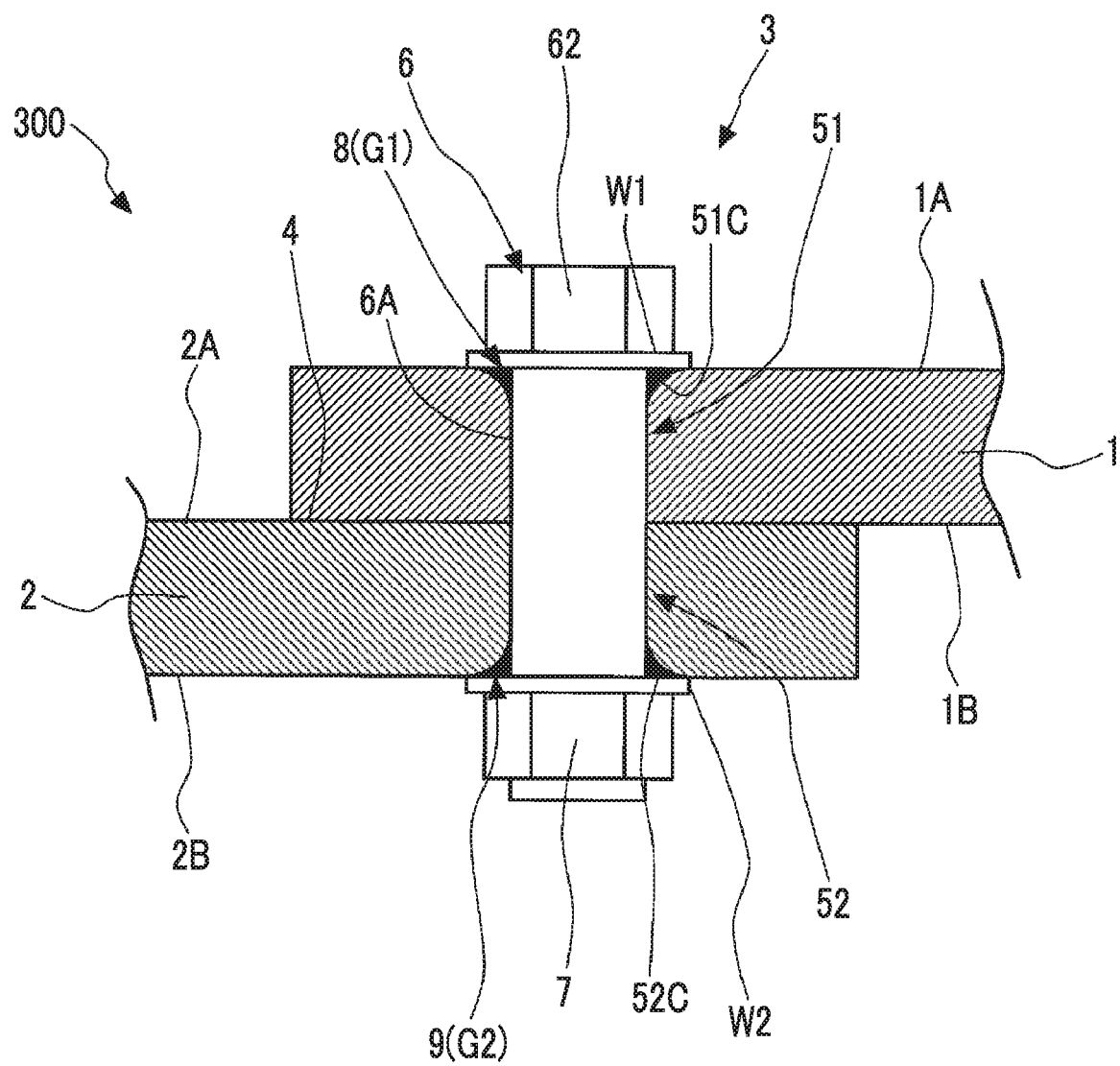
FIG. 7 is a cross-sectional view illustrating a configuration of a composite material assembly according to a third embodiment.

Next, a third embodiment of the present invention will be described with reference to FIG. 7. Like configurations similar to those in each of the above-described embodiments are denoted by like reference numerals, and detailed description thereof will be omitted. As illustrated in the figure, in a composite material assembly 300 according to the present embodiment, the first chamfered portion 51C is formed only on the other end edge of the first hole 51, and the second chamfered portion 52C is formed only on one end edge of the second hole 52. The first ring 8 is attached between the first chamfered portion 51C and the bolt outer peripheral surface 6A, and the second ring 9 is attached between the second chamfered portion 52C and the bolt outer peripheral surface 6A. Furthermore, in the present embodiment, the first ring 8 is formed integrally with the first washer W1. The second ring 9 is formed integrally with the second washer W2. Specifically, the first ring 8 is provided integrally with one surface of the first washer W1 in the thickness direction. The second ring 9 is provided integrally with the other surface of the second washer W2 in the thickness direction.

With this configuration, since the first washer W1 and the first ring 8 are formed integrally with each other and the second washer W2 and the second ring 9 are formed integrally with each other, the dimensions of the first ring 8 and the second ring 9 are large. As a result, the elastic modulus and strength of the first ring 8 and the second ring 9 can be improved. That is, the possibility of deformation of the first ring 8 and the second ring 9 can be reduced compared to the case where the first ring 8 and the second ring 9 are formed independently of the first washer W1 and the second washer W2, respectively. Furthermore, the number of components and the number of processes of the composite material assembly 300 can be reduced.

The third embodiment of the present invention has been described above. In addition, various changes and modifications of the above-described configuration can be made without departing from the gist of the present invention.

For example, the above configuration can be combined with the configuration described in the second embodiment. That is, the first chamfered portions 51C may be formed on both ends of the first hole 51, and the second chamfered portions 52C may be formed on both ends of the second hole 52. Furthermore, it is also possible to adopt a configuration in which the first ring 8 is attached to both the first chamfered portions 51C, and the second ring 9 is attached to both the second chamfered portions 52C.

In addition, in the above-described embodiment, the example in which the composite material assembly 300 is applied to the fuselage or wing of an aircraft has been described. However, the application target of the composite material assembly 300 is not limited to an aircraft, and the composite material assembly 300 can be applied to other transport machines including vehicles and the like, and further to other structures.

Moreover, in the above embodiment, the example in which the bolt 6 (and the nut 7) is used as the fastener 3 has been described. However, the specific aspect of the fastener 3 is not limited to the above example, and other fasteners including rivets can be used as the fastener 3.

INDUSTRIAL APPLICABILITY

According to the above aspects, a decrease in strength can be suppressed.

REFERENCE SIGNS LIST 100 composite material assembly
200 composite material assembly
300 composite material assembly
1 first composite material
2 second composite material
3 fastener
4 abutment surface
6 bolt
7 nut
8 first ring
8' first ring
9 second ring
9' second ring
51 first hole
52 second hole
61 shank
62 head
1A first surface
2A second surface
51A first inner peripheral surface
51C first chamfered portion
52A second inner peripheral surface
52C second chamfered portion
6A bolt outer peripheral surface
8A first ring outer peripheral surface
8A' first ring outer peripheral surface
8B first ring inner peripheral surface
8B' first ring inner peripheral surface
9A second ring outer peripheral surface
9A' second ring outer peripheral surface
9B second ring inner peripheral surface
9B' second ring inner peripheral surface
G1 gap
G2 gap
W1 first washer
W2 second washer

The invention claimed is:

1. A composite material assembly comprising:
a first composite material having a first hole formed therein;
a second composite material having a second hole formed therein; and
a fastener that connects the first composite material to the second composite material by being inserted into the first hole and the second hole,
wherein a first chamfered portion which is chamfered is formed on at least one of both ends of the first hole,
wherein a second chamfered portion which is chamfered is formed on at least one of both ends of the second hole,
wherein the composite material assembly further comprises:
a first ring that fills a gap formed between the fastener and the first chamfered portion, and
a second ring that fills a gap formed between the fastener and the second chamfered portion, and
wherein the first ring and the second ring are formed of a material having a higher elastic modulus than the first composite material and the second composite material.

2. The composite material assembly according to claim 1,
wherein the first chamfered portion is formed only on an end edge of the first hole on the second composite material side, out of the both ends of the first hole, and
wherein the second chamfered portion is formed only on an end edge of the second hole on the first composite material side, out of the both ends of the second hole.

3. The composite material assembly according to claim 1,
wherein the first chamfered portion is formed on the both ends of the first hole, and
wherein the second chamfered portion is formed on the both ends of the second hole.

4. The composite material assembly according to claim 1,
wherein the first chamfered portion is formed only on an end edge of the first hole opposite to the second composite material, out of the both ends of the first hole, and
wherein the second chamfered portion is formed only on an end edge of the second hole opposite to the first composite material, out of the both ends of the second hole.

5. The composite material assembly according to claim 1,
wherein the fastener includes
a bolt inserted into the first hole and the second hole,
a nut attached to a tip of the bolt,
a first washer interposed between a head of the bolt and the first composite material, and
a second washer interposed between the nut and the second composite material,
wherein the first ring is formed integrally with the first washer, and
wherein the second ring is formed integrally with the second washer.

6. The composite material assembly according to claim 1,
wherein the first chamfered portion has a curved surface shape that gradually curves from an inner peripheral surface of the first hole toward a surface of the first composite material, and
wherein the second chamfered portion has a curved surface shape that gradually curves from an inner peripheral surface of the second hole toward a surface of the second composite material.

* * * * *